UNITED STATES PATENT OFFICE.

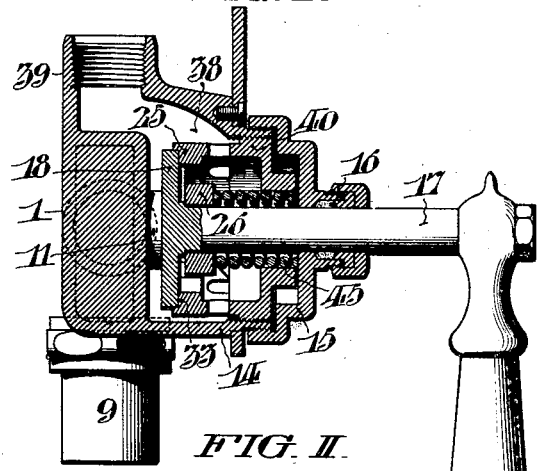

WILLIAM L. ROSS, OF PHILADELPHIA, PENNSYLVANIA.

MIXING-FAUCET.

1,071,464.

Specification of Letters Patent.    Patented Aug. 26, 1913.

Application filed September 7, 1911. Serial No. 648,100.

*To all whom it may concern:*

Be it known that I, WILLIAM L. ROSS, of Philadelphia, in the county of Philadelphia and State of Pennsylvania, have invented certain new and useful Improvements in Mixing-Faucets, whereof the following is a specification, reference being had to the accompanying drawings.

My invention relates to mixing faucets by which two liquids may be simultaneously discharged through a common aperture in any desired proportions or either one discharged alone or both shut off.

It concerns more particularly certain improvements in mixing faucets of the types for which, in conjunction with Gertrude L. Tollinger, administratrix of David L. Tollinger, lately deceased, I secured Letters Patent of the United States No. 949,044, dated February 15th, 1910; and has particular relation to an improved construction of the facing disks for the valve seat, and to the employment of continuous spring pressure to supplement the pressure of the valve obtained by the resiliency of the facing disk and by the engagement of the cam inclines of the disk which occurs when the valve is moved toward closure.

In the accompanying drawings, Figure I, is an axial section of a mixing faucet embodying my invention. Fig. II, is a cross section taken along the line II, II, of Fig. III. Fig. III, is an axial section taken along the line III, III, of Fig. II.

Additional views of certain of the parts are shown in Figs. IV, and V, of the drawings of my patent previously referred to, but as these details form no part of the present invention they are not here repeated.

As shown in the figures, the base 1, of the faucet contains two fluid chambers 2, 3, separated by a central partition 4. The chamber 2, communicates by the elbow 5, with one of the supply pipes, for example the hot water supply, a coupling 6, being interposed, in which may be introduced a check valve 7. The chamber 3, similarly communicates by the elbow 8, with the other feed pipe, say the cold water pipe, with similar interposition of a coupling 9.

Above the base of the faucet is formed the valve seat 10, pierced by a circular aperture 12, communicating with the hot water chamber, and with another circular aperture 13, communicating with the cold water chamber, the two apertures being diagonally opposite with relation to the axial line of the valve. Surrounding each of these apertures the valve seat is provided with a groove 16, of sufficient depth to receive and firmly seat the separate annular resilient disks 11. These annular disks are of sufficient thickness to not only seat themselves in the groove, as explained, but to project a considerable distance thereabove, affording abundant wearing surface, so that they may wear down as the valve is tightened. I find advantage in thus providing two separate resilient annular disks, one for each of the openings of the valve seat, as compared with the provision of a single facing disk of resilient material for said valve, as shown in the preceding patent, in that the pressure due to the engagement of the valve with these disks is obtained more immediately in the region of the apertures, thus tending to prevent cross mixing.

Upon the valve side of the faucet is formed the extended valve casing 14, closed by a threaded top 15, and provided with a stuffing box 16, for the reception of the valve stem 17, which carries the valve disk 18. This valve disk rests closely upon the annular disks 11, seated upon the valve seat. It is pierced by two circular apertures 19, and 20, placed as shown in Fig. II, where one of them is in full registry with its corresponding aperture in the valve seat, while the periphery of the other is approaching its corresponding aperture in the valve seat, so that in proportion as rotation of the valve tends to close, the hot water aperture 12, will the cold water aperture 13, be opened, and vice versa.

Upon the outer surface of the rotary valve disk are two shallow cam inclines 22, 22, formed on opposite sides of the axis of the valve. These cam inclines do not reach to the edge of the valve disk and therefore leave around said edge an annular bearing surface 23.

Within the valve casing rests a collar 25, provided on its outer edge with keys 28, 28, entering the key-ways 29, 29, formed in the inner wall of the valve casing; and further provided with projections 30, 30, sustaining a central ring 26, which surrounds the valve stem 17. The projections 30, have on their inner sides cam inclines 31, which coöperate with the cam inclines 22, upon the valve disk to increase the pressure of the valve upon its seat as it approaches closure. The inner edge of the collar 25 has a seat 33, adjacent the cam inclines, which forms a bearing surface which exerts pressure upon the corresponding bearing surface 23, on the outer surface of the valve disk. In other respects this collar is identical with that described in my previous patent and need not be here further described. The annular space between the outer edge of the collar 25 and valve casing communicates with an exit way 38, forming part of the valve casing, and passing to a discharge orifice 39. The collar 25 and therefore the valve when properly seated within the valve casing, are held in place by the annular threaded cap 40, screwed into the valve casing. As this cap is screwed into place, the collar is driven down so that its bearing surface 33, presses against the corresponding bearing surface 22, of the valve disk with an adjustable pressure quite independent of the additional pressure which is exerted upon the disk by virtue of the engagement of the cam inclines as the valve approaches complete closure. A coiled spring 45, surrounds the valve stem bearing at one end against the ring 26, of the collar and at the other end against the iner surface of the top 15.

The operation of the valve has been fully described in my previous patent, and need not be here repeated, other than to explain the special operation of those portions of the structure which are added by my present invention.

In assembling the parts the annular cap 40, is set so as to press the collar 25, and therefore the valve, with firm pressure against the resilient disks which surround the openings of the valve seat, which pressure is increased by the cam inclines as the valve approaches complete closure. As the resilient disks wear away proper pressure is maintained by screwing up this cap, but should this be omitted the spring 45, constantly maintains a sufficient pressure upon the valve to prevent cross mixing. The function of the two separate annular resilient disks surrounding the apertures in the valve seat have already been adverted to. They restrict the region of pressure to points surrounding the aperture and thus make a better closure and tend to prevent cross mixing. They are further readily replaceable.

Having thus described my invention, I claim:

1. In a mixing faucet a valve casing containing a valve seat having apertures therethrough, a rotary disk mixing valve, coöperating cam members for positively pressing said valve against its seat when closed, and a coiled spring operating to hold said valve against the seat for preventing cross mixing when said valve is moved from closed position.

2. In a mixing faucet, a valve casing containing a valve seat with its apertures, a rotary disk mixing valve, a screw cap within the casing, coöperating cam members positioned by said cap for positively pressing said valve against its seat when closed, a top for closing the casing independent of the screw cap, a coiled spring surrounding the valve stem exerting thrust between the valve and the casing, and independently exerting its expansive force to that exerted by the screw cap to maintain the valve upon its seat.

3. In a mixing faucet, a valve casing containing a valve seat with two apertures therein, a rotary disk mixing valve, having two apertures extending therethrough, two independent annular resilient facing disks, one for each aperture of the valve seat, said valve seat having grooves in which said disks are seated, a cap within the casing, coöperaing cam members positioned by said cap for positively pressing said valve against its seat, and a coiled spring surrounding the valve stem, and independently exerting its force to that exerted by the screw cap to maintain the valve upon its seat.

In testimony whereof, I have hereunto signed my name at Philadelphia, Pennsylvania, this fifth day of September, 1911.

WILLIAM L. ROSS.

Witnesses:
JAMES H. BELL,
E. L. FULLERTON.